(12) United States Patent
Benner et al.

(10) Patent No.: US 11,656,105 B2
(45) Date of Patent: May 23, 2023

(54) OPTICAL POSITION-MEASURING DEVICE

(71) Applicant: DR. JOHANNES HEIDENHAIN GmbH, Traunreut (DE)

(72) Inventors: Ulrich Benner, Trostberg (DE); Tarek Nutzinger, Vachendorf (DE); Daniel Krempke, Teisendorf (DE); Johannes Haunreiter, Burghausen (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 59 days.

(21) Appl. No.: 17/534,493

(22) Filed: Nov. 24, 2021

(65) Prior Publication Data
US 2022/0163354 A1 May 26, 2022

(30) Foreign Application Priority Data
Nov. 25, 2020 (DE) ...................... 10 2020 214 778.7

(51) Int. Cl.
*G01D 5/347* (2006.01)
*G01B 11/14* (2006.01)
*G01D 5/353* (2006.01)

(52) U.S. Cl.
CPC ......... *G01D 5/34723* (2013.01); *G01B 11/14* (2013.01); *G01D 5/347* (2013.01); *G01D 5/34784* (2013.01); *G01D 5/3537* (2013.01)

(58) Field of Classification Search
CPC ..... G01B 11/00; G01B 11/002; G01B 11/005; G01B 11/02; G01B 11/14; G01D 5/2451;
(Continued)

(56) References Cited

U.S. PATENT DOCUMENTS 4,953,933 A * 9/1990 Asmar .................. H03M 1/285
                                                                 385/124
5,251,012 A * 10/1993 Riegger ............. G01D 5/34792
                                                                 356/617
(Continued)

FOREIGN PATENT DOCUMENTS

DE       102016211150 A1     12/2017
EP           3633323 A1      4/2020
WO      WO-2020012776 A1 *   1/2020

*Primary Examiner* — Gordon J Stock, Jr.
(74) *Attorney, Agent, or Firm* — Leydig, Voit & Mayer, Ltd.

(57) ABSTRACT

An optical position-measuring device includes a scale and a scanning unit. The scale is connected to a first object, extends along a measurement direction and includes a first track having an incremental measuring graduation, and a second track having an absolute measuring graduation. The scanning unit is connected to a second object and includes a light source, a detector having an absolute detector arrangement configured to detect an aperiodic light pattern transmitted from the absolute measuring graduation onto a detection plane and an incremental detector arrangement configured to detect a periodic light pattern transmitted from the incremental measuring graduation onto a detection plane, and a fiber-optic plate arranged as a continuous component in front of the absolute detector arrangement and the incremental detector arrangement, wherein both absolute track information and incremental track information in the respective detection planes are transmitted via the fiber-optic plate in this manner.

14 Claims, 3 Drawing Sheets

(58) Field of Classification Search
CPC .. G01D 5/2452; G01D 5/2454; G01D 5/2455; G01D 5/2457; G01D 5/2458; G01D 5/26; G01D 5/268; G01D 5/28; G01D 5/30; G01D 5/32; G01D 5/34; G01D 5/342; G01D 5/347; G01D 5/34707; G01D 5/34715; G01D 5/3473; G01D 5/34746; G01D 5/34776; G01D 5/34784; G01D 5/34792; G01D 5/34794; G01D 5/3537
See application file for complete search history.

(56) References Cited

U.S. PATENT DOCUMENTS

| | | | |
|---|---|---|---|
| 5,336,884 | A | 8/1994 | Khoshnevisan et al. |
| 10,060,765 | B2 | 8/2018 | Holzapfel et al. |
| 11,307,060 | B2 * | 4/2022 | Suzuki ................ G01D 5/3473 |
| 2004/0217268 | A1 | 11/2004 | Tobiason et al. |
| 2014/0353477 | A1 | 12/2014 | Johnson et al. |
| 2017/0059368 | A1 | 3/2017 | Holzapfel et al. |
| 2019/0376818 | A1 * | 12/2019 | Fukuda .............. G01D 5/34723 |
| 2020/0109969 | A1 | 4/2020 | Suzuki et al. |

\* cited by examiner

OPTICAL POSITION-MEASURING DEVICE

CROSS REFERENCE TO RELATED APPLICATION

This application claims benefit to German Patent Application No. DE 10 2020 214 778.7, filed on Nov. 25, 2020, which is hereby incorporated by reference herein.

FIELD

The present invention relates to an optical position-measuring device. This is suitable for determining the position of a first object relative to a second object.

BACKGROUND

A generic position-measuring arrangement is known from DE 10 2016 211 150 A1. This serves to determine the position of a first object relative to a second object, wherein the objects are arranged so as to be movable relative to one another along at least one measurement direction. In this case, on the one hand, a scale extending along the measurement direction is provided, which is connected to the first object. The scale comprises a first track having an incremental measuring graduation having graduation regions having different optical properties. The graduation regions are arranged alternately periodically along the measurement direction having the measuring graduation periodicity $P_{INC}$, wherein the measuring graduation periodicity $P_{INC}$ indicates the sum of the widths of adjacent, different graduation regions. The scale further comprises a second track having an absolute measuring graduation, which has a code for absolute position determination and comprises graduation regions having different optical properties arranged aperiodically along the measurement direction. Furthermore, the position-measuring device has a scanning unit which is connected to the second object. The scanning unit comprises at least one light source and a detector having an absolute detector arrangement for detecting an aperiodic light pattern transmitted from the absolute measuring graduation onto a detection plane and an incremental detector arrangement for detecting a periodic light pattern transmitted from the incremental measuring graduation onto the detection plane. Further, the scanning unit has a fiber-optic plate which comprises a plurality of optical fibers arranged adjacently and whose image entry area faces the scale and whose image exit area faces the detector.

Such a position-measuring device makes it possible, for example, to determine the position of a movable machine component in relation to a machine frame stationary in comparison thereto. The movable machine component on the one hand and the stationary machine frame on the other hand thus act here as the two objects movable relative to one another. A superordinate machine controller which uses the generated position-dependent signals, for example, to position the movable machine component, serves as subsequent electronics.

The fiber-optic plate used in the scanning unit described in the explained exemplary embodiment of the publication is used for scanning the coded absolute measuring graduation. This means that, during a measurement operation, a light pattern is transmitted via the fiber-optic plate onto the detection plane of the detector, which light pattern results from the interaction of the beam emitted by the light source with the absolute measuring graduation. In order to scan the incremental measuring graduation on the scale, a separate scanning reticle having a suitable scanning grating is arranged in the scanning unit adjacent to the fiber-optic plate. During the assembly of the scanning unit, such a structure results in two components then having to be aligned or mounted very precisely relative to the respective detector arrangements with the fiber-optic plate and the scanning reticle. The production-related different thicknesses of the fiber-optic plate and the scanning reticle also result in an edge forming between the adjacently arranged components. Dirt can accumulate at this edge during measuring operation, thereby jeopardizing the operability of the position-measuring device.

The use of a fiber-optic plate in the scanning unit of an optical position-measuring device is also known from EP 3 633 323 A1. However, the position-measuring device described there does not have a scale with separate tracks for an incremental measuring graduation and an absolute measuring graduation. Since the problems explained above thus do not occur in this position-measuring device, suggestions for optimizing the position-measuring device discussed above or for solving the aforementioned problems cannot be learned from this document.

SUMMARY

In an embodiment, the present invention provides an optical position-measuring device for determining a position of a first object relative to a second object that is movable relative to the first object along at least one measurement direction. The optical position-measuring device includes a scale and a scanning unit. The scale is connected to the first object and extends along the measurement direction. The scale comprises: a first track having an incremental measuring graduation including graduation regions having different optical properties, the graduation regions of the incremental measuring graduation being arranged alternately periodically and the incremental measuring graduation having a measuring graduation periodicity along the measurement direction, wherein the measuring graduation periodicity indicates a sum of widths of adjacent, different graduation regions, and a second track having an absolute measuring graduation including graduation regions having different optical properties, the absolute measuring graduation having a code for absolute position determination and the graduation regions of the absolute measuring graduation being arranged aperiodically along the measurement direction. The scanning unit is connected to the second object and comprises: at least one light source, a detector having an absolute detector arrangement configured to detect an aperiodic light pattern transmitted from the absolute measuring graduation onto a detection plane and an incremental detector arrangement configured to detect a periodic light pattern transmitted from the incremental measuring graduation onto a detection plane, and a fiber-optic plate having a plurality of optical fibers arranged adjacent to one another. The fiber-optic plate has an image entry area which faces the scale and an image exit area which faces the detector, and is arranged as a continuous component in front of the absolute detector arrangement and the incremental detector arrangement, wherein both absolute track information and incremental track information in the respective detection planes are transmitted via the fiber-optic plate in this manner.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
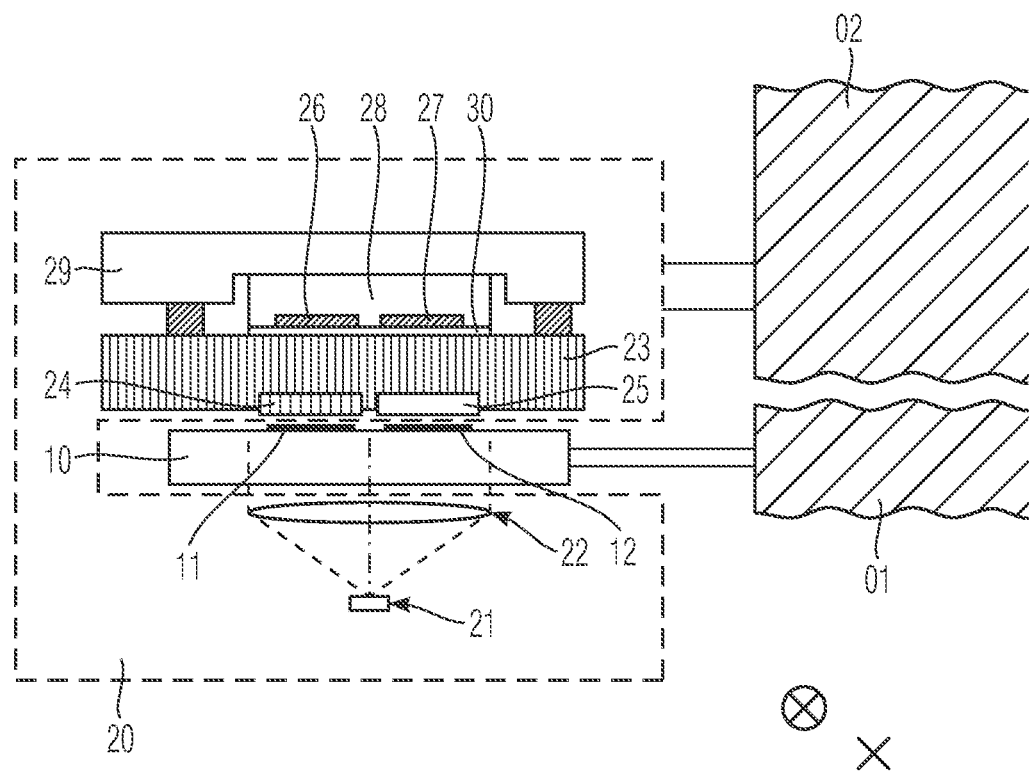
FIG. 1 is a highly schematic representation of an exemplary embodiment of the optical position-measuring device according to the invention in a sectional view.

In an embodiment, the present invention provides an optical position-measuring device of the type described above, which enables a simplified assembly of the components of the scanning unit and at the same time is as insensitive as possible to potential contamination.

The optical position-measuring device according to an embodiment of the invention serves to determine the position of a first object relative to a second object movable along at least one measurement direction relative thereto. It comprises a scale extending along the measurement direction which is connected to the first object. The scale has a first track having an incremental measuring graduation comprising graduation regions having different optical properties, which are arranged alternately periodically having a measuring graduation periodicity along the measurement direction, wherein the measuring graduation periodicity indicates the sum of the widths of adjacent, different graduation regions. Further, the scale has a second track having an absolute measuring graduation, which has a code for absolute position determination and comprises graduation regions having different optical properties, which are arranged aperiodically along the measurement direction. The position-measuring device further comprises a scanning unit connected to the second object. On the scanning unit side, at least one light source is provided as well as a detector having an absolute detector arrangement for detecting an aperiodic light pattern transmitted from the absolute measuring graduation onto a detection plane and an incremental detector arrangement for detecting a periodic light pattern transmitted from the incremental measuring graduation onto the detection plane. Further, the scanning unit comprises a fiber-optic plate which comprises a plurality of optical fibers arranged adjacently, an image entry area of which faces the scale and an image exit area of which faces the detector. The fiber-optic plate is arranged as a continuous component in front of the absolute detector arrangement and the incremental detector arrangement in such a manner that both absolute track information and incremental track information are transmitted on the respective detection planes via the fiber-optic plate.

The fiber-optic plate preferably has a scanning grating in a region before the incremental detector arrangement.

In this case, the scanning grating may be designed as an amplitude grating and comprises permeable and opaque lined grating regions arranged alternately along the measurement direction, wherein the grating regions of the scanning grating are arranged periodically having a scanning grating periodicity and the scanning grating periodicity indicates the sum of the widths of adjacent transparent and opaque grating regions.

The optical fibers are advantageously arranged in the fiber-optic plate along the measurement direction in a grating having an average fiber periodicity for which $$P_{AG}/2 > P_{Fx}$$

applies, where
$P_{Fx}$:=average fiber periodicity along the measurement direction x
$P_{AG}$:=scanning grating periodicity It is also possible for the scanning grating to be arranged on the image entry area of the fiber-optic plate facing the scale.

It can also be provided that a planar, optically opaque coating having an incremental scanning window and an absolute scanning window is arranged at least partially on the image entry area of the fiber-optic plate facing the scale, wherein the scanning grating is arranged in the incremental scanning window.

Furthermore, the scanning grating periodicity may be selected not equal to the measuring graduation periodicity of the incremental measuring graduation.

For example, the scanning grating periodicity may be selected as per $$P_{AG}=(k \cdot P_{DET} \cdot P_{INC})/(k \cdot P_{DET}+/-P_{INC}),$$

where:
$P_{AG}$:=scanning grating periodicity
$P_{INC}$:=measurement periodicity of the incremental measuring graduation
$P_{DET}$:=detector periodicity of the incremental detector arrangement
k:=3,4

Furthermore, $$n \cdot P_{AG}=P_{DET}$$

may apply, where:
$P_{AG}$:=scanning grating periodicity
$P_{DET}$:=detector periodicity of the incremental detector arrangement
n:=1, 2, 3, . . .

Alternatively, it is also possible for the scanning grating periodicity to be selected at least within a scanning grating region equal to the measuring graduation periodicity of the incremental measuring graduation.

It is advantageously provided that the incremental detector arrangement comprises a plurality of light-sensitive detector elements arranged periodically having a detector periodicity along the measurement direction, wherein the detector periodicity indicating the width of a detector element along the measurement direction.

In this case, three or four detector elements may be arranged along the measurement direction within a period of the periodic light pattern transmitted from the incremental measuring graduation onto the detection plane.

It can furthermore be provided that the incremental detector arrangement and the absolute detector arrangement are integrated into an opto-ASIC which is arranged in a recess of a carrier element, wherein the top side of the opto-ASIC projects beyond the top side of the carrier element.

In this case, the fiber-optic plate can be arranged on the upper side of the opto-ASIC, wherein an interstitial medium is located at least between the image exit areas of the fiber-optic plate and the detector arrangements.

As a significant advantage of the solution according to an embodiment of the invention, during the assembly of the scanning unit, only a single component now has to be aligned and mounted relative to the detector, since a continuous fiber-optic plate is provided in front of the two detector arrangements. The fiber-optic plate designed as a continuous component has a surface without protrusions or edges on which contaminants might otherwise accumulate.

Further details and advantages of embodiments of the present invention are explained on the basis of the following description of exemplary embodiments of the device according to the invention in conjunction with the figures.

A schematic sectional view of an exemplary embodiment of the position-measuring device according to the invention is shown in FIG. 1; further details of this device are shown in the following FIGS. 2 and 3. The exemplary embodiment is explained below with reference to the various figures.

The position-measuring device according to an embodiment of the invention serves to determine the position of a first object O1 relative to a second object O2 that is movable relative thereto along at least one measurement direction x. In this case, one of the objects O1, for example a first machine component, is connected to the scale 10 of the position-measuring device extending along the measurement direction x. The other object O2, for example a second machine component, is movable relative to the first machine component along the measurement direction x and is connected to the scanning unit 20 of the position-measuring device. In the present exemplary embodiment, a relative movement of the two objects O1, O2 along a linear measurement direction x is provided, wherein the measurement direction x in FIG. 1 is oriented perpendicular to the plane of the drawing.

With the aid of the position-measuring device according to an embodiment of the invention, position-dependent signals can be generated from the optical scanning of the scale 10 with respect to the position of the two mutually movable objects O1, O2 or of the corresponding machine components and transmitted to subsequent electronics. As subsequent electronics, for example, a higher-level machine controller can be provided which uses the position-dependent signals for positioning the machine components.

The scale 10 comprises a transparent carrier substrate, for example glass, on the upper side of which, in the present exemplary embodiment, a first track extending along the measurement direction x is arranged having an incremental measuring graduation 11 and a second track parallel thereto having an absolute measuring graduation 12.

The incremental measuring graduation 11 comprises graduation regions having different optical properties which are arranged alternately periodically along the measurement direction x having a measuring graduation periodicity $P_{INC}$; in this case, the measuring graduation periodicity $P_{INC}$ indicates the sum of the widths of two adjacent graduation regions. In the example shown, the incremental measuring graduation 11 is designed as amplitude gratings, i.e., the different graduation regions each have different optical transmittancies; thus, on the one hand, optically opaque graduation regions, for example made of chromium, and on the other hand, optically transparent graduation regions are provided.

The absolute measuring graduation 12 has a code for absolute position determination and comprises graduation regions having different optical properties arranged aperiodically along the measurement direction x. Analogously to the incremental measuring graduation 11, the different graduation regions of the absolute measuring graduation 12 have different optic transmittancies. The aperiodic code of the absolute measuring graduation 12 can be designed, for example, as a pseudo-random code (RRC).

From the optical scanning of the absolute measuring graduation 12, coarse absolute position information is obtained in the position-measuring device according to an embodiment of the invention, which is calculated having the high-resolution incremental position information generated from the optical scanning of the incremental measuring graduation 11. High-resolution absolute position information with respect to the position of the two objects O1, O2 is thus provided on the output side, which can be further processed, for example, by the downstream machine controller.

In the position-measuring device according to an embodiment of the invention, the further required components for optically scanning the scale 10 or the two measuring graduations 11, 12 and for generating the position-dependent signals are arranged on the scanning unit 20. This includes the light source 21 arranged on one side of the scale 10, which light source is designed, for example, as a LED (Light Emitting Diode) and emits radiation, for example, having a wavelength of 850 nm. Collimation optics 22 are arranged upstream of the light source 21 in the beam propagation direction in order to collimate the beam of the light source 21 emitted in the direction of the scale 10.

On the opposite side of the scale 10, further components are arranged in the scanning unit 20 and serve for optical scanning of the two measuring graduations 11, 12 and for generating the position-dependent signals. Thus, a fiber-optic plate 23 is provided there, which comprises a plurality of optical fibers arranged adjacently and whose image entry area faces the scale 10 and whose image exit area faces a downstream detector having an incremental detector arrangement 26 and an absolute detector arrangement 27. The incremental detector arrangement 26 serves to detect a periodic light pattern transmitted from the incremental measuring graduation 11 onto a detection plane; with the aid of the absolute detector arrangement 27, an aperiodic light pattern transmitted from the absolute measuring graduation 12 onto a detection plane is detected. Via the fiber-optic plate 23, the information from the two measuring graduations 11, 12 is transmitted onto the detection planes of the associated detector arrangements 26, 27.

In the exemplary embodiment shown, the incremental detector arrangement 26 and the absolute detector arrangement 27 are integrated into an opto-ASIC 28 which is arranged in the scanning unit 20 in a recess of a carrier element 29, for example a suitable circuit board or printed circuit board. In the opto-ASIC 28, the detected signals are already processed before they are transmitted to subsequent electronics. As can be seen from FIG. 1, the upper side of the opto-ASIC 28 projects beyond the upper side of the carrier element 29.

An interstitial medium 30 is also arranged between the image exit areas of the fiber-optic plate 23 and the light-sensitive surfaces of the detector arrangements 26, 27 integrated into the opto-ASIC 29. This is selected in such a manner that the beam bundles exiting the image exit areas of the fiber-optic plate 23 experience less deflection on the path to the respective detector arrangements 26, 27 than in the case without an interstitial medium. In addition to minimizing refractive index jumps and the reflections at interfaces connected thereto, it is thus ensured in particular that a high-contrast light pattern results on the detection planes of the incremental detector arrangement 26 and the absolute detector arrangement 27. In connection with the interstitial medium 30, it is also to be noted that dirt in the region between the fiber-optic plate 23 and the opto-ASIC 29 can be prevented. Adhesives having a suitably selected refractive index can be considered as the material for the interstitial medium 30, for example. With regard to further details regarding the interstitial medium 30, reference is expressly made to the aforementioned publication DE 10 2016 211 150 A1.

In order to avoid the problems discussed at the outset, the optical position-measuring device according to an embodiment of the invention now provides that the fiber-optic plate 23 arranged in the scanning unit 20 is arranged as a continuous component in front of the absolute detector arrangement 27 and the incremental detector arrangement 26 or their light-sensitive surfaces. In this manner, both absolute track information and incremental track information in the respective detection planes of the associated detector arrangements 26, 27 are transmitted via the fiber-optic plate 23. In contrast thereto, the fiber-optic plate in DE 10 2016 211 150 A1 is used only for transmitting the light pattern from the coded absolute measuring graduation onto the detection plane of the absolute detector arrangement. In the scanning beam path for incremental signal generation, a separate scanning reticle is provided there having a scanning grating integrated therein between the incremental measuring graduation and the incremental detector arrangement.

As a result, when assembling the position-measuring device according to an embodiment of the invention, in comparison to the known approach, only a single component has to be correctly aligned and assembled with respect to the detector arrangements 26, 27 or the opto-ASIC; the result is a significantly reduced assembly effort. The surface of the fiber-optic plate 23 facing the scale 10 is continuously flat and in particular has no edge which is unavoidable for incremental scanning in the case of an additional scanning reticle. As a result, no dirt can accumulate on this surface during measuring operation. Easier handling of the fiber-optic plate 23 during the assembly process is also possible if this surface can be used for vacuum suction by a suitable positioning device. Further, the thickness of the fiber-optic plate 23 can essentially be selected as desired. In this manner, it is possible to ensure mechanical protection for the sensitive components arranged downstream in the beam path by dimensioning the fiber-optic plate 23.

The fiber-optic plate 23 inserted comprises a plurality of adjacently arranged optical fibers which are fused together and cut and then sanded to form a plane-parallel plate. Commercially available are such fiber-optic plates under the designation "Fiber Optic Faceplates".

With regard to the function of the fiber-optic plate 23 for scanning the absolute measuring graduation 12 and the transmission of the absolute track information into the detection plane of the absolute detector arrangement 27, reference is made to DE 10 2016 211 150 A1.

In order to also be able to transmit the incremental track information about the fiber-optic plate 23 onto the detection plane of the incremental detector arrangement, further measures prove advantageous in the position-measuring device according to an embodiment of the invention. Thus, a scanning grating 24 is arranged on the fiber-optic plate 23 in a region before the incremental detector arrangement 26. In the present exemplary embodiment, the arrangement of the scanning grating 24 is provided on the image entry area of the fiber-optic plate 23 facing the scale 10. The scanning grating 24 is in this case designed as an amplitude grating. This comprises transparent and opaque lined grating regions arranged periodically in the measurement direction x, the longitudinal direction of which is oriented perpendicularly to the measurement direction x. The width of adjacently arranged, transparent and opaque grating regions in the scanning grating 24 is referred to below as scanning grating periodicity $P_{AG}$.

In one possible exemplary embodiment of the optical position-measuring device according to the invention, the scanning grating periodicity $P_{AG}$ is selected to be significantly greater than an average fiber periodicity $P_{Fx}$. This indicates a measure of the mean periodicity of the raster of optical fibers along the measurement direction x in the fiber-optic plate 23. It is preferably provided that the following relationship applies to these two periodicities:

$$P_{AG}/2 > P_{Fx} \qquad (Eq. 1),$$

where
$P_{Fx}$:=average fiber periodicity along the measurement direction x
$P_{AG}$:=scanning grating periodicity Such dimensioning of the two periodicities $P_{AG}$, $P_{Fx}$ ensures that as many optical fibers as possible contribute to signal transmission in the region of the transparent grating regions of the scanning grating 24.

Figure 2:
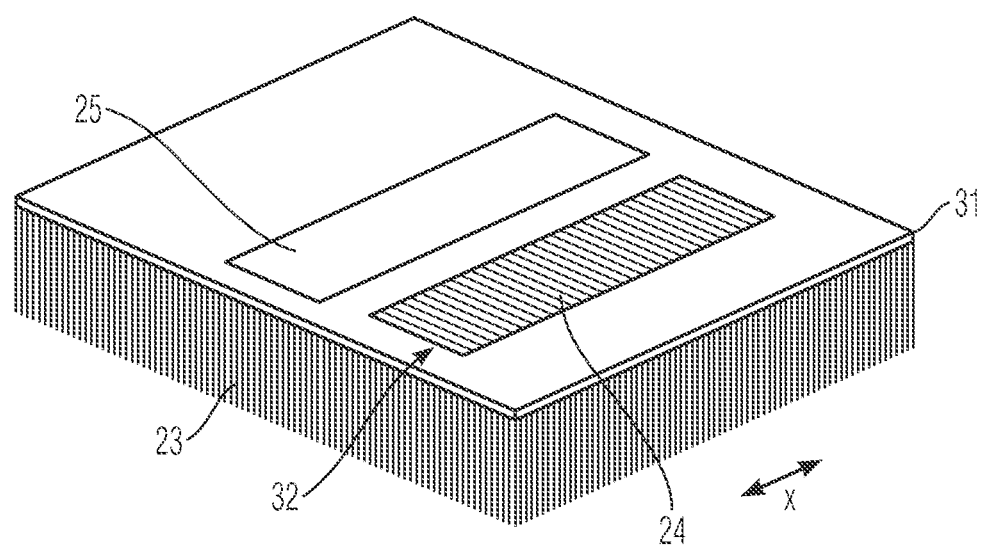
FIG. 2 is a spatial representation of the fiber-optic plate of the position-measuring device from FIG. 1.

A corresponding fiber-optic plate 23 is shown in a perspective view in FIG. 2. The upper side of the fiber-optic plate 23 represents the image entry area which faces the scale in the position-measuring device according to an embodiment of the invention. As can be seen from the figure, a planar, optically opaque coating 31 is arranged on the upper side of the fiber-optic plate 23 and has two rectangular scanning windows 32, 25. On the one hand, an incremental scanning window 32 is provided in the coating 31 in which the scanning grating 24 is arranged. On the other hand, the coating 31 has an absolute scanning window 25 which is designed to be largely transparent. The incremental scanning window 32 is arranged in a region of the fiber-optic plate 23 before the incremental detector arrangement 26, and the absolute scanning window 25 is arranged in a region of the fiber-optic plate 23 before the absolute detector arrangement 27.

In the position-measuring device according to an embodiment of the invention, the detector having the absolute detector arrangement 27 and the incremental detector arrangement 26 is arranged downstream of the fiber-optic plate 23.

The absolute detector arrangement 27 comprises a periodical arrangement of individual light-sensitive detector elements, for example a suitable CCD line, along the measurement direction x.

The incremental detector arrangement 26 comprises a plurality of light-sensitive detector elements which are periodically arranged having a detector periodicity $P_{DET}$ along the measurement direction x. The detector periodicity $P_{DET}$ indicates the width of a detector element along the measurement direction x. In this connection, reference is made to the illustration in FIG. 3, which shows a schematic, enlarged sectional view of the position-measuring device according to an embodiment of the invention in the region between the incremental detector arrangement 26 and the scanning grating 24.

Figure 3:
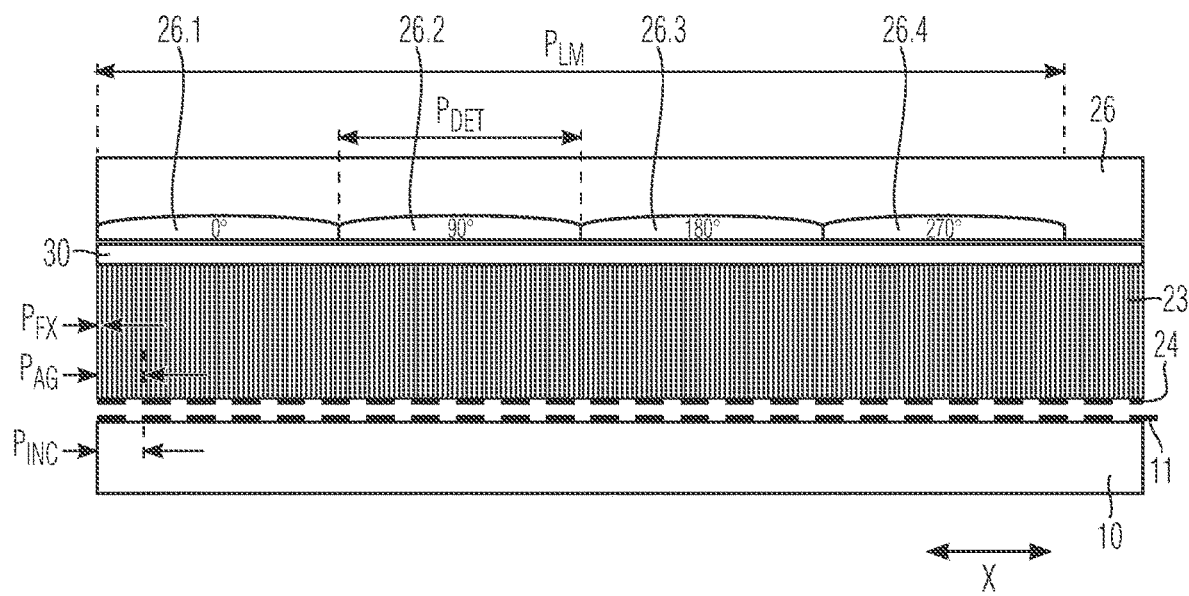
FIG. 3 is an enlarged sectional view of the position-measuring device of FIG. 1 in the region of the incremental detector arrangement.

In the exemplary embodiment shown in FIG. 3, a measuring graduation periodicity $P_{INC}=20$ µm is provided on the scale 10 for the incremental measuring graduation 11. The scanning grating 24 on the side of the fiber-optic plate 23 on the image entry area has a scanning grating periodicity $P_{AG}=19{,}512$ µm and thus deviates slightly from the measuring graduation periodicity $P_{INC}$. The periodic light pattern resulting from the interaction of the beam bundles having the incremental measuring graduation 11 and the scanning grating 24 is transmitted via the fiber-optic plate 23 onto the detection plane of the incremental detector arrangement 26; it has a light pattern periodicity of $P_{LM}$=800 µm. As can be seen from FIG. 3, four detector elements 26.1-26.4 are arranged along the measurement direction x within a period of the light pattern on the detection plane, at which in case of the relative movement of the scale 10 and the scanning unit 20, phase-shifted incremental signals having the phase positions 0°, 90°, 180°, 270° indicated in the figure result; the detector periodicity $P_{DET}$ is $P_{DET}$=200 µm in the present exemplary embodiment.

Variants of the optical position-measuring device according to embodiments of the invention, which generally differ by the selection of the scanning grating periodicity $P_{AG}$, are considered in more detail below.

In a first variant, the scanning grating periodicity $P_{AG}$ is selected analogously to the example from FIG. 3 that is discussed, namely in such a manner that the scanning grating periodicity $P_{AG}$ is selected not equal to the measuring graduation periodicity $P_{INC}$ of the incremental measuring graduation, i.e. $P_{AG} \neq P_{INC}$.

In this case, after the interaction of the beam bundles emitted by the light source having the incremental measuring graduation and the scanning grating, a periodic (Vernier) light pattern with the light pattern periodicity $P_{LM}$ results on the detection plane. The light pattern periodicity $P_{LM}$ results according to the following relationship:

$$P_{LM}=+/-P_{AG} \cdot P_{INC}/(P_{AG}-P_{INC}) \quad (Eq.\ 2),$$

where:
$P_{LM}$:=light pattern periodicity
$P_{AG}$:=scanning grating periodicity
$P_{INC}$:=measuring graduation periodicity Within a light pattern period, three or four detector elements are then usually arranged evenly distributed on the incremental detector arrangement. During a relative movement of the dimensional design and scanning unit, these supply three incremental signals phase-shifted by 120° or four shifted by 90°. Typically, several (N) light pattern periods are scanned with the aid of the incremental detector arrangement. For each incremental signal phase, several (N) detector elements connected in parallel then contribute to signal generation. If, accordingly, k (3, 4) detector elements are used per light pattern period, then the following applies:

$$k \cdot P_{DET}=+/-P_{AG} \cdot P_{INC}(P_{AG}-P_{INC}) \quad (Eq.\ 3),$$

where:
k:=3,4
$P_{DET}$:=detector periodicity
$P_{LM}$:=light pattern periodicity
$P_{AG}$:=scanning grating periodicity
$P_{INC}$:=measuring graduation periodicity With a predetermined measuring graduation periodicity $P_{INC}$ and detector periodicity $P_{DET}$, the required scanning grating periodicity $P_{AG}$ then results from this relationship as follows:

$$P_{AG}=(k \cdot P_{DET} \cdot P_{INC})/(k \cdot P_{DET}+/-P_{INC}) \quad (Eq.\ 4),$$

where:
$P_{AG}$:=scanning grating periodicity
$P_{INC}$:=measurement periodicity of the incremental measuring graduation
$P_{DET}$:=detector periodicity of the incremental detector arrangement
k:=3,4

In the case of the first variant considered with $P_{AG} \neq P_{INC}$, the extent to which the scanning grating periodicity $P_{AG}$ and the measuring graduation periodicity $P_{INC}$ differ from one another should also be noted. It generally depends on how many optically opaque grating regions per detector element contribute to the signal extraction.

If, as in the above example in FIG. 3, there is only a small difference between the scanning grating periodicity $P_{AG}$ and the measuring graduation periodicity $P_{INC}$, a similar number of optically opaque grating regions of the scanning grating per detector element contributes to the signal extraction for each of the phases of different detector elements. In this case, the resulting, phase-shifted incremental signals then differ only insignificantly with respect to their offsets, amplitude, and phase relationships.

If, on the other hand, the scanning grating periodicity $P_{AG}$ and the measuring graduation periodicity $P_{INC}$ differ significantly, it may happen that a varying number of optically opaque grating regions of the scanning grating per detector element contribute to the signal extraction. As a result, the resulting phase-shifted incremental signals have distinct differences with respect to the offsets, amplitude, and phase relationships thereof; errors in the position determination can result. In order to counteract this problem, it can be predetermined as a further condition for the design of the scanning grating that, for each detector element, the same number n of optically opaque grating regions of the scanning grating should contribute to the signal extraction, i.e., the following condition must then additionally be satisfied:

$$n \cdot P_{AG}=P_{DET} \quad (Eq.\ 5),$$

where:
$P_{AG}$:=scanning grating periodicity
$P_{DET}$:=detector periodicity of the incremental detector arrangement
n:=1, 2, 3, . . .

As a result of this additional condition, only certain permissible values for the detector periodicity $P_{DET}$ or light pattern periodicity $P_{LM}$ are possible in the corresponding position-measuring device, which result from the following condition:

$$P_{DET}=+/-P_{INC}/k+n \cdot P_{INC} \quad (Eq.\ 6),$$

where
$P_{DET}$:=detector periodicity of the incremental detector arrangement
$P_{INC}$:=measurement periodicity of the incremental measuring graduation
k=3, 4
n=1, 2, 3, . . .

Ideally, the detector periodicity $P_{DET}$ of the incremental detector arrangement should also still be selected as a natural multiple of the measuring graduation periodicity $P_{INC}$, since the image of the scale structure transferred via the fiber-optic plate would then be filtered. According to equation 6), however, the additional implementation of this condition is not possible.

In the case where k=4 and a measuring graduation periodicity $P_{INC}$=20 µm, approximately the following possible values for the detector periodicity $P_{DET}$ or the light pattern periodicity $P_{LM}$ result:

| n | $P_{DET}$-/µm | $P_{LM}$-/µm | $P_{DET}$+/µm | $P_{LM}$+/µm |
|---|---|---|---|---|
| 1 | 15 | 60 | 25 | 100 |
| 2 | 35 | 140 | 45 | 180 |
| etc. | | | | |

Since, as mentioned above, an ideal solution with $P_{DET}=n \cdot P_{AG}$ and $P_{DET}=i \cdot P_{INC}$ (n, i natural numbers>0) is not possible within the scope of Vernier scanning, an attempt can be made to find an optimal compromise. This might be that n and i are not selected as natural numbers but are replaced by real-valued factors fn and fi that are as close as possible to natural numbers.

With the conditions $$P_{AG}=fn \cdot P_{DET} \quad \text{(Eq. 7a)}$$

and $$P_{INC}=fi \cdot P_{DET} \quad \text{(Eq. 7b)}$$

then, together with eq. 3) the following results:

$$k \cdot P_{DET}=+/-fn \cdot fi \cdot P_{DET}/(fn-fi) \quad \text{(Eq. 8),}$$

where: k=3, 4,
and thus $$k=fi/(1-fi/fn) \quad \text{(Eq. 9).}$$

This results in a beat between $P_{DET}$ and $P_{AG}$ or $P_{INC}$, the periodicity of which can in each case be described as:

$$S_{AG}=abs(P_{DET} \cdot P_{AG}/(P_{DET}-P_{AG})) \quad \text{(Eq. 10a)}$$

or $$S_{INC}=abs(P_{DET} \cdot P_{AG}/((P_{DET}-P_{INC})) \quad \text{(Eq. 10b)}$$

It is now further advantageous if the total length of the incremental detector arrangement $L_{INC}$ that results according to $$L_{INC}=N \cdot k \cdot P_{DET} \quad \text{(Eq. 11)}$$

(N: number of Vernier periods scanned)
and the two beat periodicities $S_{AG}$ and $S_{INC}$ differ by natural number factors M1 and M2:

$$L_{INC}=M1 \cdot S_{AG} \quad \text{(Eq. 12a)}$$

$$L_{INC}=M2 \cdot S_{INC} \quad \text{(Eq. 12b)}$$

Figure 4:
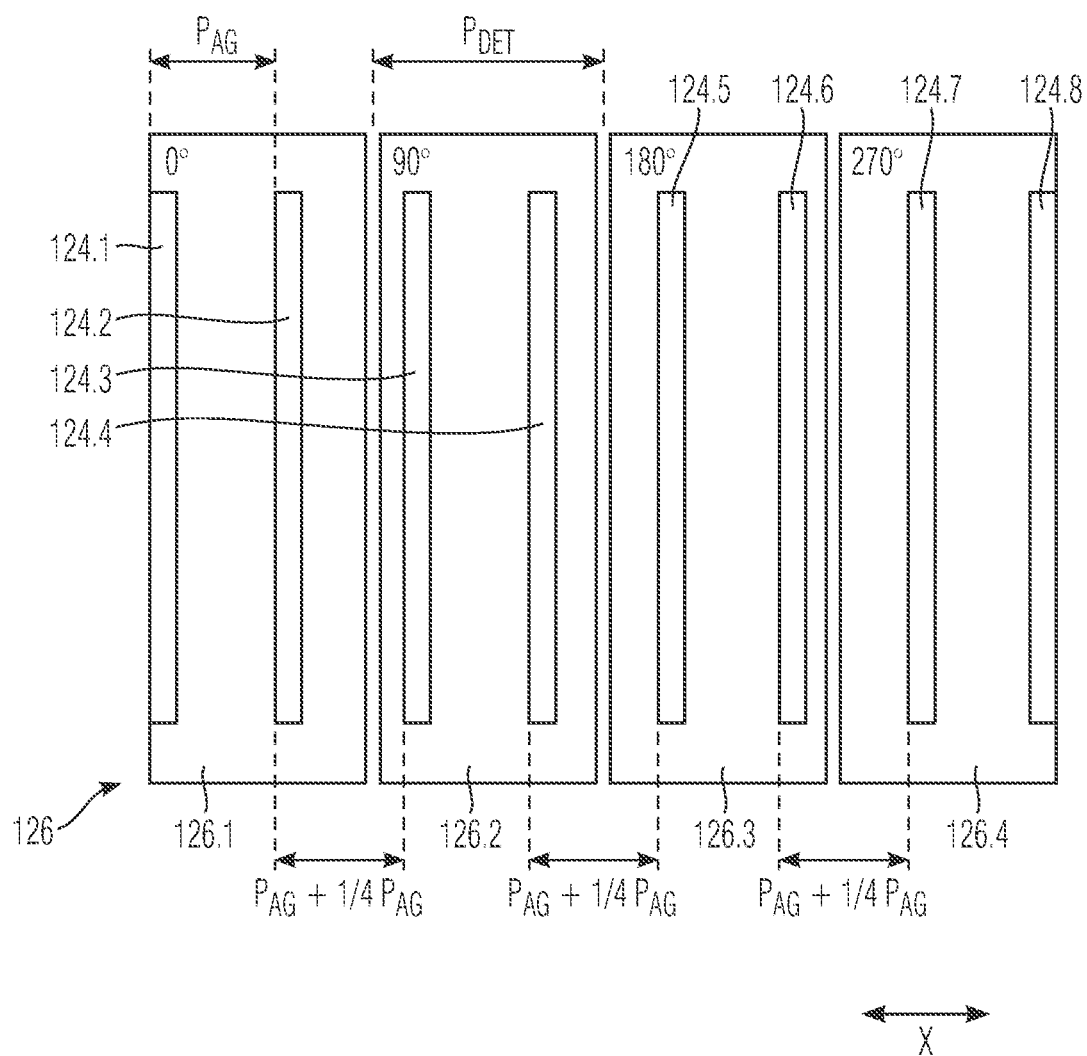
FIG. 4 an illustration with a part of the incremental detector arrangement and of the scanning grating in a further embodiment of the optical position-measuring device according to the invention.

A second variant of the position-measuring device according to an embodiment of the invention is considered below; in this case, the scanning grating periodicity $P_{AG}$ is now selected at least within a scanning grating region equal to the measuring graduation periodicity $P_{INC}$ of the incremental measuring scale, i.e. $P_{AG}=P_{INC}$ applies. FIG. 4 shows a representation having a part of the incremental detector arrangement 126 and of the scanning grating of such a variant of the optical position-measuring device according to an embodiment of the invention, in which the generation of k=4 incremental signals phase-shifted by 90° is provided. As can be seen from the figure, n=2 of the opaque grating regions 124.1-124.8 are assigned to each detector element 126.1-126.4 of the incremental detector arrangement 126. Within scanning grating regions corresponding to the width or periodicity $P_{DET}$ of the incremental detector arrangement 126 along the measurement direction x, there is a scanning grating periodicity $P_{AG}$ corresponding to the measuring graduation periodicity $P_{INC}$ of the incremental measuring graduation. There is a distance $P_{AG}+\frac{1}{4} P_{AG}$ between the opaque grating regions 124.1-124.8 assigned to adjacent detector elements 126.1-126.4. Analogously, in the case of k=3 incremental signals phase-shifted by 120°, this distance would be $P_{AG}+\frac{1}{3} P_{AG}$.

If, in such a variant, the scanning grating periodicity $P_{AG}$ is selected in the order of magnitude of the detector periodicity $P_{DET}$, i.e. $P_{AG}=P_{INC}=P_{DET}$ applies, only a single (n=1) opaque grating region of the scanning grating is assigned to one detector element of the incremental detector arrangement. In this case, a distance $P_{AG}+\frac{1}{4} P_{AG}$ would also be present between opaque grating regions assigned to adjacent detector elements.

In addition to the specific exemplary embodiments described, there naturally are further design possibilities within the scope of the present invention.

It is thus possible to design the position-measuring device according to an embodiment of the invention not only for detecting relative movements along a linear measurement direction. Of course, rotational relative movements about an axis of rotation can also be detected.

Alternatively to the explained example, the scanned measuring graduations can also be designed as phase gratings, etc.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An optical position-measuring device for determining a position of a first object relative to a second object that is movable relative to the first object along at least one measurement direction, the optical position-measuring device comprising:
   a scale connected to the first object and extending along the measurement direction, the scale comprising:
      a first track having an incremental measuring graduation including graduation regions having different optical properties, the graduation regions of the incremental measuring graduation being arranged alternately periodically and the incremental measuring graduation having a measuring graduation periodicity along the measurement direction, wherein the measuring graduation periodicity indicates a sum of widths of adjacent, different graduation regions, and
      a second track having an absolute measuring graduation including graduation regions having different optical properties, the absolute measuring graduation having a code for absolute position determination and the graduation regions of the absolute measuring graduation being arranged aperiodically along the measurement direction; and
   a scanning unit connected to the second object, the scanning unit comprising:
      at least one light source,
      a detector having an absolute detector arrangement configured to detect an aperiodic light pattern transmitted from the absolute measuring graduation onto a detection plane and an incremental detector arrangement configured to detect a periodic light pattern transmitted from the incremental measuring graduation onto a detection plane, and a fiber-optic plate having a plurality of optical fibers arranged adjacent to one another, the fiber-optic plate having an image entry area which faces the scale and an image exit area which faces the detector, the fiber-optic plate being arranged as a continuous component in front of the absolute detector arrangement and the incremental detector arrangement, wherein both absolute track information and incremental track information in the respective detection planes are transmitted via the fiber-optic plate in this manner.

2. The optical position-measuring device according to claim 1, wherein the incremental detector arrangement comprises a plurality of light-sensitive detector elements which are arranged periodically and has a detector periodicity along the measurement direction, and wherein the detector periodicity indicates a width of a detector element along the measurement direction.

3. The optical position-measuring device according to claim 2, wherein three or four detector elements are arranged along the measurement direction within a period of the periodic light pattern transmitted from the incremental measuring graduation onto the detection plane.

4. The optical position-measuring device according to claim 1, wherein the incremental detector arrangement and the absolute detector arrangement are integrated into an opto-application-specific integrated circuit (ASIC) which is arranged in a recess of a carrier element, and wherein an upper side of the opto-ASIC projects beyond an upper side of the carrier element.

5. The optical position-measuring device according to claim 4, wherein the fiber-optic plate is arranged on the upper side of the opto-ASIC, and wherein an interstitial medium is located at least between the image exit areas of the fiber-optic plate and the detector arrangements.

6. The optical position-measuring device according to claim 1, wherein the fiber-optic plate has a scanning grating in a region before the incremental detector arrangement.

7. The optical position-measuring device according to claim 6, wherein the scanning grating is arranged on the image entry area of the fiber-optic plate facing the scale.

8. The optical position-measuring device according to claim 6, wherein a flat, optically opaque coating having an incremental scanning window and an absolute scanning window is at least partially arranged on the image entry area of the fiber-optic plate facing the scale, and wherein the scanning grating is arranged in the incremental scanning window.

9. The optical position-measuring device according to claim 6, wherein the scanning grating is an amplitude grating and includes transparent and opaque lined grating regions arranged alternately along the measurement direction, and wherein the grating regions of the scanning grating are arranged periodically and the scanning grating has a scanning grating periodicity that indicates a sum of widths of adjacent transparent and opaque grating regions.

10. The optical position-measuring device according to claim 9, wherein the optical fibers are arranged in the fiber-optic plate along the measurement direction in a grating having an average fiber periodicity for which:

$$P_{AG}/2 > P_{Fx}$$

applies, where $P_{Fx}$:=the average fiber periodicity along the measurement direction x, and $P_{AG}$:=the scanning grating periodicity.

11. The optical position-measuring device according to claim 9, wherein the scanning grating periodicity is at least within a scanning grating region equal to the measuring graduation periodicity of the incremental measuring graduation.

12. The optical position-measuring device according to claim 9, wherein the scanning grating periodicity is not equal to the measuring graduation periodicity of the incremental measuring graduation.

13. The optical position-measuring device according to claim 12, wherein the scanning grating periodicity is selected according to:

$$P_{AG} = (k \cdot P_{DET} \cdot P_{INC})/(k \cdot P_{DET} +/- P_{INC}),$$

where:

$P_{AG}$:=the scanning grating periodicity, $P_{INC}$:=the measuring graduation periodicity, $P_{DET}$:=a detector periodicity of the incremental detector arrangement, and k:=3, 4.

14. The optical position-measuring device according to claim 13, wherein:

$$n \cdot P_{AG} = P_{DET}$$

applies, where:

$P_{AG}$:=the scanning grating periodicity $P_{DET}$:=the detector periodicity of the incremental detector arrangement n:=1, 2, 3, etc.

* * * * *